US012645177B2

(12) United States Patent
Maeda

(10) Patent No.: US 12,645,177 B2
(45) Date of Patent: Jun. 2, 2026

(54) FIXING DEVICE OF AN IMAGE FORMING APPARATUS FOR FIXING IMAGES BY APPLYING HEAT AND PRESSURE, AND IMAGE FORMING APPARATUS

(71) Applicant: SHARP KABUSHIKI KAISHA, Sakai City (JP)

(72) Inventor: Tomohiro Maeda, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/931,319

(22) Filed: Oct. 30, 2024

(65) Prior Publication Data

US 2025/0164913 A1 May 22, 2025

(30) Foreign Application Priority Data

Nov. 21, 2023 (JP) ................................ 2023-197360

(51) Int. Cl.
*G03G 15/20* (2006.01)
*G03G 15/00* (2006.01)

(52) U.S. Cl.
CPC ..... *G03G 15/2064* (2013.01); *G03G 15/2053* (2013.01); *G03G 15/80* (2013.01)

(58) Field of Classification Search
USPC .......................................................... 399/329
See application file for complete search history.

(56) References Cited

U.S. PATENT DOCUMENTS

2006/0133868 A1 * 6/2006 Kobayashi ......... G03G 21/1685 399/329
2012/0201582 A1 8/2012 Shimura et al.

FOREIGN PATENT DOCUMENTS

JP 2011-151003 A 8/2011

* cited by examiner

*Primary Examiner* — Quana Grainger
(74) *Attorney, Agent, or Firm* — ScienBiziP, P.C.

(57) ABSTRACT

A fixing device includes a fixing pad and a heater. The fixing pad is in contact with an inner surface of a fixing belt and is located opposite a pressure roller to form a nip between the fixture and the pressure applicator where the pressure is applied to the paper. The heater is attached to the fixing pad and has a positive temperature coefficient. The heater has a heating surface that faces toward the nip and generates heat. The heating surface and the inner surface of the fixing belt have an insulating layer (substrate) therebetween.

5 Claims, 5 Drawing Sheets

FIXING DEVICE OF AN IMAGE FORMING APPARATUS FOR FIXING IMAGES BY APPLYING HEAT AND PRESSURE, AND IMAGE FORMING APPARATUS

CROSS-REFERENCE TO RELATED APPLICATION

The present application claims priority from Japanese Application JP 2023-197360, the content to which is hereby incorporated by reference into this application.

BACKGROUND OF THE INVENTION

1. Field of the Invention

The present disclosure relates to a fixing device that applies heat and pressure to paper to fix an image to the paper, and an image forming apparatus.

2. Description of the Related Art

Conventionally, a fixing device that is used in an electrophotographic image forming apparatus such as a copier or a printer applies heat and pressure to paper having an unfixed toner image formed thereon to fix the toner image to the paper. In recent years, a fixing device including an endless fixing belt has been proposed, in which a heater is used to heat the fixing belt. In an image forming apparatus, where various sizes of paper is used, the temperature of a region through which no paper passes (non-paper passing region) gradually increases as image fixing is repeated. In order to solve this problem, a method has been proposed for reducing unevenness of the heat distribution in the width direction of paper.

SUMMARY OF THE INVENTION

The heater of such a conventional image forming apparatus as described above includes a substrate and a heat generation block formed on the substrate. The heat generation block includes: a first conductor provided on the substrate and extending in the longitudinal direction of the substrate; a second conductor provided on the substrate at a position different from the first conductor in the transverse direction of the substrate; and a plurality of heat generation resistors connected in parallel between the first conductor and the second conductor. In the heat generation block, a heat generation resistor located toward an end has a resistivity value higher than a heat generation resistor located at a center in the longitudinal direction.

In the conventional image forming apparatus, the heater has a structure in which electrodes are provided on side surfaces of the heat generation resistors, and the entire area between the electrodes generates heat. Such a structure allows the heat to diffuse easily, making it difficult to heat the fixing belt efficiently.

The present disclosure has been made in order to solve the problems described above, and an object thereof is to provide a fixing device and an image forming apparatus that achieve efficient heat transfer to a fixing belt therein.

A fixing device according to an aspect of the present disclosure applies heat and pressure to paper nipped between a cylindrical fixing belt and a pressure applicator to fix an image to the paper. The fixing device includes a fixture and a heater. The fixture is in contact with an inner surface of the fixing belt and is located opposite the pressure applicator to form a nip between the fixture and the pressure applicator where the pressure is applied to the paper. The heater is attached to the fixture and has a positive temperature coefficient. The heater has a heating surface that faces toward the nip and generates heat. The heating surface and the inner surface of the fixing belt have an insulating layer therebetween.

The fixing device according to an aspect of the present disclosure may have a configuration in which the heater has a plurality of heating elements arranged in an axial direction of the pressure applicator.

The fixing device according to an aspect of the present disclosure may have a configuration in which the insulating layer has, on a side thereof facing toward the heating surface, power supply electrodes that supply electric power to the heater.

The fixing device according to an aspect of the present disclosure may have a configuration in which the heater has electrodes on a back surface thereof opposite to the heating surface, and has, over a side surface thereof, a conduction path that conducts electric power from the back surface to the heating surface.

The fixing device according to an aspect of the present disclosure may have a configuration in which the heater has a sliding layer on a surface thereof in contact with the inner surface of the fixing belt.

The fixing device according to an aspect of the present disclosure may have a configuration in which the heater is longer than the nip in a conveyance direction of the paper.

An image forming apparatus according to an aspect of the present disclosure includes the fixing device according to the present disclosure.

According to the present disclosure, the configuration in which the heating surface faces toward the fixing belt allows for efficient heat transfer to the fixing belt.

DETAILED DESCRIPTION OF THE INVENTION

First Embodiment

The following describes a fixing device and an image forming apparatus according to a first embodiment of the present disclosure with reference to the accompanying drawings.

Figure 1:
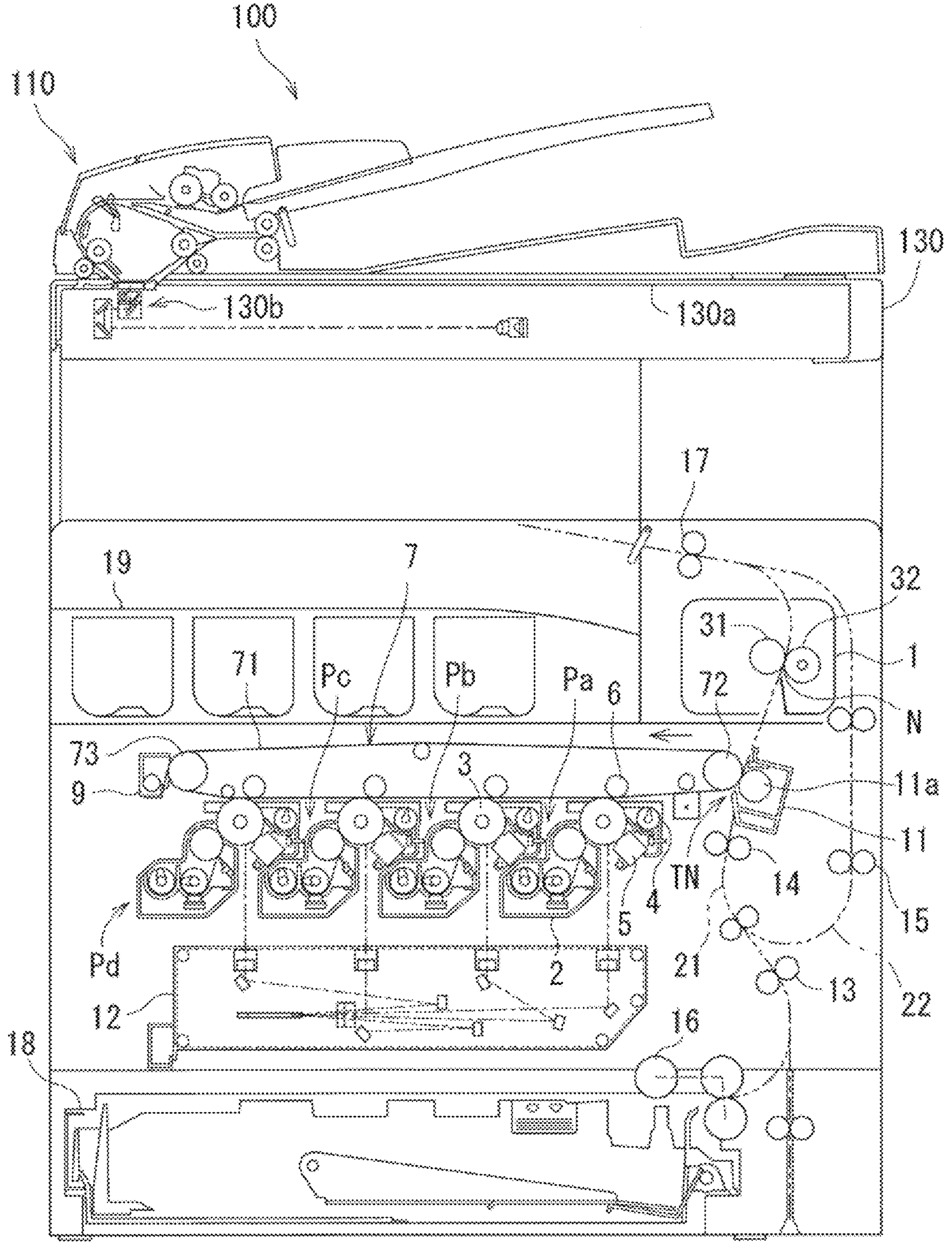
FIG. 1 is a schematic cross-sectional view of a configuration of an image forming apparatus according to a first embodiment of the present disclosure.

FIG. 1 is a schematic cross-sectional view of a configuration of the image forming apparatus according to the first embodiment of the present disclosure.

An image forming apparatus 100 is a multifunction peripheral having a copier function, a scanner function, a facsimile machine function, and a printer function. The image forming apparatus 100 transmits an image of a document read by an image reading device 130 to an external destination, or forms an image of a document read by the image reading device 130 or an image received from an external source on a recording medium such as paper in color or monochrome.

A document feeding device 110 is provided above the image reading device 130, and supported in an openable and closable manner. The document feeding device 110 feeds one or more document sheets one at a time in sequence. The image reading device 130 reads a document placed on a document table 130*a* by scanning the document using an optical scanning system 130*b* or reads a document fed by the document feeding device 110, and thus generates image data.

The image forming apparatus 100 includes, for example, a fixing device 1, developing devices 2, photosensitive drums 3, drum cleaning devices 4, chargers 5, an intermediate transfer belt device 7, a secondary transfer device 11, an optical scanning device 12, and a paper feeder 18.

The image forming apparatus 100 handles image data for a color image to be formed using different colors including black (K), cyan (C), magenta (M), and yellow (Y) or for a monochrome image to be formed using a single color (for example, black). In order to form four different toner images, the image forming apparatus 100 includes four developing devices 2, four photosensitive drums 3, four drum cleaning devices 4, and four chargers 5, which correspond to the four colors including black, cyan, magenta, and yellow, and form four image stations Pa, Pb, Pc, and Pd.

The optical scanning device 12 forms an electrostatic latent image by exposing the surface of each photosensitive drum 3 to light. Each of the developing devices 2 develops the electrostatic latent image on the surface of the corresponding photosensitive drum 3 to form a toner image on the surface of the photosensitive drum 3. Each of the drum cleaning devices 4 removes and collects residual toner on the surface of the corresponding photosensitive drum 3. Each of the chargers 5 uniformly charges the surface of the corresponding photosensitive drum 3 to a predetermined potential. Toner images in the respective colors are formed on the surfaces of the respective photosensitive drums 3 through the series of operations described above.

The intermediate transfer belt device 7 includes intermediate transfer rollers 6, an endless intermediate transfer belt 71, an intermediate transfer driving roller 72, an intermediate transfer driven roller 73, and a cleaning device 9. The intermediate transfer belt device 7 has four intermediate transfer rollers 6 provided inside the intermediate transfer belt 71 so as to form four different toner images corresponding to the respective colors. The intermediate transfer rollers 6 transfer the toner images in the respective colors formed on the surfaces of the photosensitive drums 3 to the intermediate transfer belt 71 in rotational movement.

The intermediate transfer belt 71 is stretched around the intermediate transfer driving roller 72 and the intermediate transfer driven roller 73. In the image forming apparatus 100, the toner images in the respective colors formed on the surfaces of the respective photosensitive drums 3 are sequentially transferred and superimposed on the surface of the intermediate transfer belt 71 to form a color toner image thereon. The cleaning device 9 removes and collects waste toner remaining on the surface of the intermediate transfer belt 71 without being transferred to paper.

The secondary transfer device 11 nips and conveys paper conveyed through a paper conveyance path 21 to a transfer nip TN between a secondary transfer roller 11*a* thereof and the intermediate transfer belt 71. The paper passing through the transfer nip TN receives the toner image transferred from the surface of the intermediate transfer belt 71, and then is conveyed to the fixing device 1.

The fixing device 1 includes a fixing belt 31 and a pressure roller 32 (an example of what is referred to as a pressure applicator) that rotate around respective axes thereof. The fixing device 1 applies heat and pressure to the paper having the toner image transferred thereto by nipping the paper at a nip N between the fixing belt 31 and the pressure roller 32 to fix the toner image to the paper. Although not shown in FIG. 1, the fixing device 1 includes components other than the fixing belt 31 and the pressure roller 32. Details of the fixing device 1 will be described below.

The paper feeder 18 includes a paper feed cassette in which recording media (paper) to be used for image formation are loaded, and is provided below the optical scanning device 12. The paper is picked up from the paper feeder 18 by a pickup roller 16, and conveyed to the paper conveyance path 21. The paper conveyed to the paper conveyance path 21 goes through the secondary transfer device 11 and the fixing device 1, and is discharged onto a paper discharge tray 19 by discharge rollers 17.

Conveyance rollers 13, registration rollers 14, and the discharge rollers 17 are arranged along the paper conveyance path 21. The conveyance rollers 13 facilitate the paper conveyance. The registration rollers 14 convey paper at the same speed as a process speed at which the image formation on the paper is performed. The registration rollers 14 are provided between the paper feeder 18 and the secondary transfer device 11, and adjust the paper conveyance timing so that the toner image is transferred to the paper by the secondary transfer device 11. For example, the registration rollers 14 wait (stop temporarily) while holding the paper conveyed from the paper feeder 18 therebetween, and then start to convey the paper at a constant speed in synchronization with the secondary transfer device 11.

In a case where an image is formed not only on a front surface of paper but also on a back surface of the paper, the conveyance direction of the paper is changed at the discharge rollers 17, so that the paper is conveyed to a reverse paper conveyance path 22. In the reverse paper conveyance path 22, reverse conveyance rollers 15 guide and convey the paper with the front and back surfaces thereof reversed to the registration rollers 14. The image forming apparatus 100 forms an image on the back surface of the paper guided by the registration rollers 14 in the same manner as on the front surface, and then discharges the paper onto the paper discharge tray 19.

Figure 2:
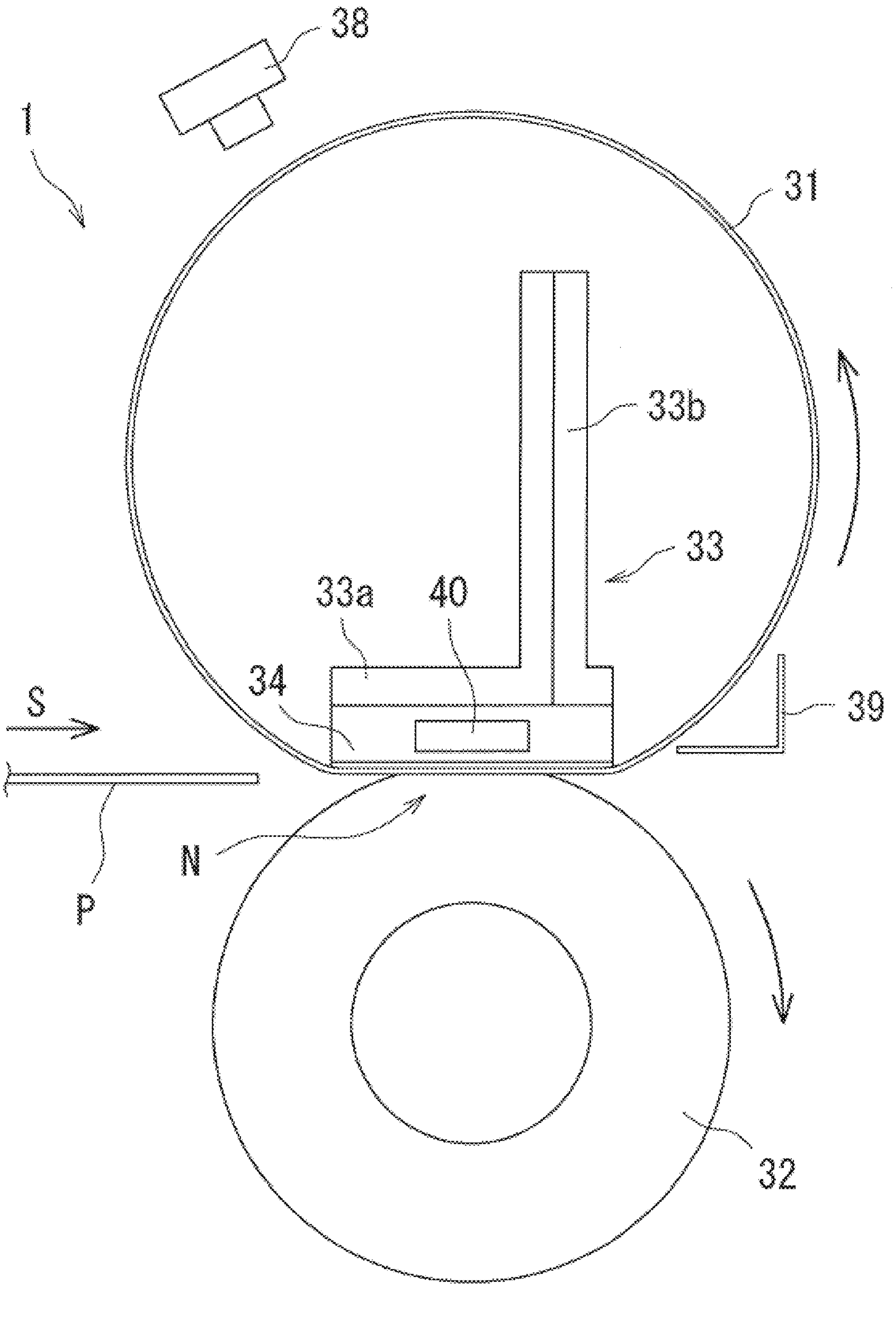
FIG. 2 is a schematic cross-sectional view of a configuration of a fixing device according to the first embodiment of the present disclosure.

FIG. 2 is a schematic cross-sectional view of a configuration of the fixing device according to the first embodiment of the present disclosure.

The fixing device 1 includes the fixing belt 31 and the pressure roller 32. As illustrated in FIG. 2, the fixing device 1 further includes a support member 33 and a fixing pad 34 inside the fixing belt 31. The fixing device 1 further includes a fixing temperature sensor 38 and a separation plate 39 outside the fixing belt 31.

The fixing belt 31 is a flexible endless belt and has a substantially circular shape. The fixing belt 31 has, for example, a configuration including a band-shaped base material formed from a synthetic resin such as polyimide or a metal such as nickel, and a release layer provided on a surface of the base material. The fixing belt 31 is rotatable around an axis extending in a direction perpendicular to the plane in FIG. 2. The axial direction of the fixing belt 31 is substantially parallel to a width direction W (see FIG. 3 mentioned below) of paper P to be conveyed. It should be noted that the width direction W of the paper P and the axial direction of the pressure roller 32 are the same in the present embodiment.

The fixing pad 34 is, for example, formed from a synthetic resin and has an elongate plate shape extending in the axial direction of the fixing belt 31 (width direction W described below). The fixing pad 34 has substantially the same length as a length of the fixing belt 31 in the width direction W. A heater 40 is attached to the fixing pad 34 as a member that heats the fixing belt 31. The heater 40 has a positive temperature coefficient (PTC). Specifically, the heater 40 is a PTC heater.

In the present embodiment, the heater 40 extending in the width direction W of the paper P to be conveyed is attached to the fixing pad 34. A configuration of the heater 40 will be described in detail with reference to FIGS. 3 and 4 below.

The support member 33 supports the fixing pad 34 while pressing the fixing pad 34 against the inner circumferential surface of the fixing belt 31. The support member 33 has a substantially L-shaped cross-section, and includes an elongate plate-shaped fixing part 33*a* to which the fixing pad 34 is fixed, and an elongate plate-shaped erected part 33*b* erected on an end portion of the fixing part 33*a*.

The pressure roller 32 is disposed in a position opposite the fixing pad 34 with the fixing belt 31 therebetween. The pressure roller 32 rotates around a rotation axis parallel to the axial direction of the fixing belt 31, and is disposed so as to extend substantially parallel to the fixing belt 31. At the nip N between the pressure roller 32 and the fixing belt 31, the fixing belt 31 is pressed against the pressure roller 32 by the fixing pad 34. The pressure roller 32 includes, for example, a circular cylindrical core material, which is formed from a metal such as aluminum, and an elastic material, such as rubber, covering a surface of the core material.

Driving force from a drive source such as a motor, not shown, is transmitted to the pressure roller 32 via other elements such as gears. The pressure roller 32 rotates by being driven by the driving force, and the fixing belt 31 rotates in an opposite direction to the rotation direction of the pressure roller 32 by being driven by the rotation of the thus driven pressure roller 32. The paper P passes through the nip N between the pressure roller 32 and the fixing belt 31 in a conveyance direction S.

The fixing temperature sensor 38 detects fixing temperature, which is the surface temperature of the fixing belt 31. The separation plate 39 is located downstream of the nip N in the conveyance direction S, and prevents the paper P from wrapping around the fixing belt 31.

Figure 3:
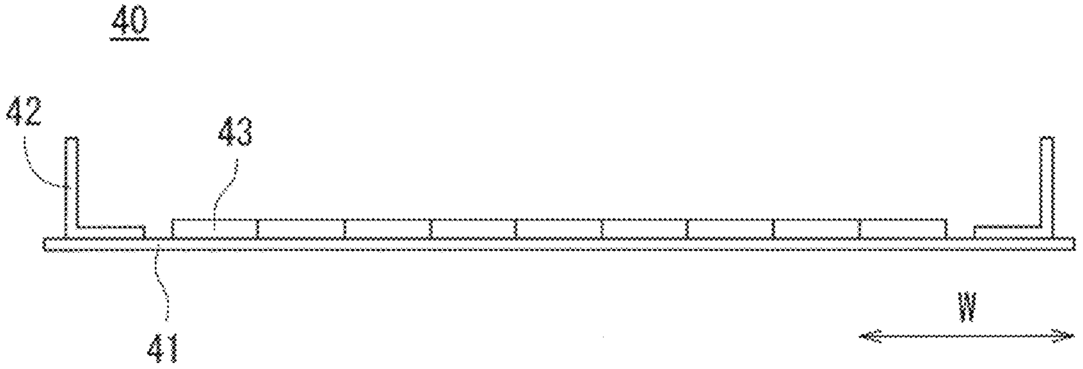
FIG. 3 is a side view of a heater.
Figure 4:
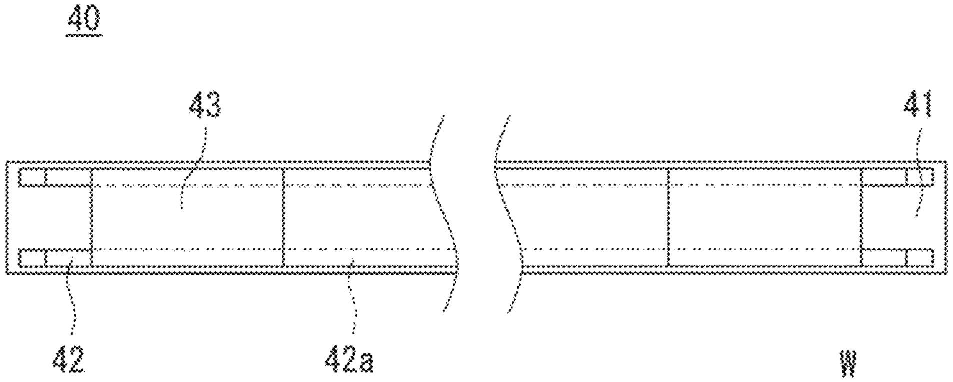
FIG. 4 is a plan view of the heater.

FIG. 3 is a side view of the heater, and FIG. 4 is a plan view of the heater.

The heater 40 has a substrate 41 extending in the width direction W, electric wires 42 (an example of power supply electrodes 42*a*), and heating elements 43. In the present embodiment, the substrate 41 is a flat plate that is elongate in the width direction W and is formed from a material that has insulating properties, such as alumina. The electric wires 42 are located at opposite ends of the substrate 41 and arranged along respective long edges of the substrate 41. It should be noted that the electric wires 42 only need to be configured to conduct electricity, and portions thereof opposed to the heating elements 43 are made thin so as to keep the distance between the substrate 41 and the heating elements 43 from being too long. The plurality of heating elements 43 are arranged in the width direction W, and are affixed to the substrate 41 with the electric wires 42 therebetween. In the present embodiment, the number of heating elements 43 can be adjusted as appropriate depending on the area to be heated, achieving efficient heating.

Figure 5:
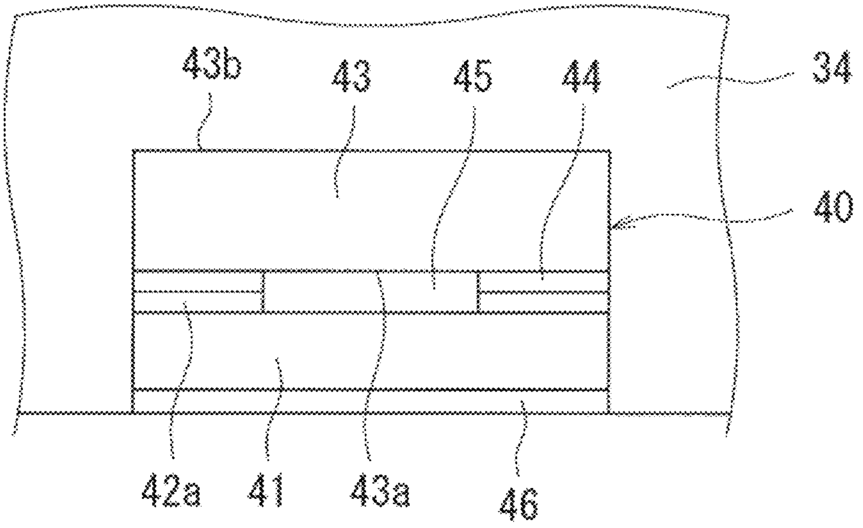
FIG. 5 is a cross-sectional view of the heater attached to a fixing pad.
Figure 6:
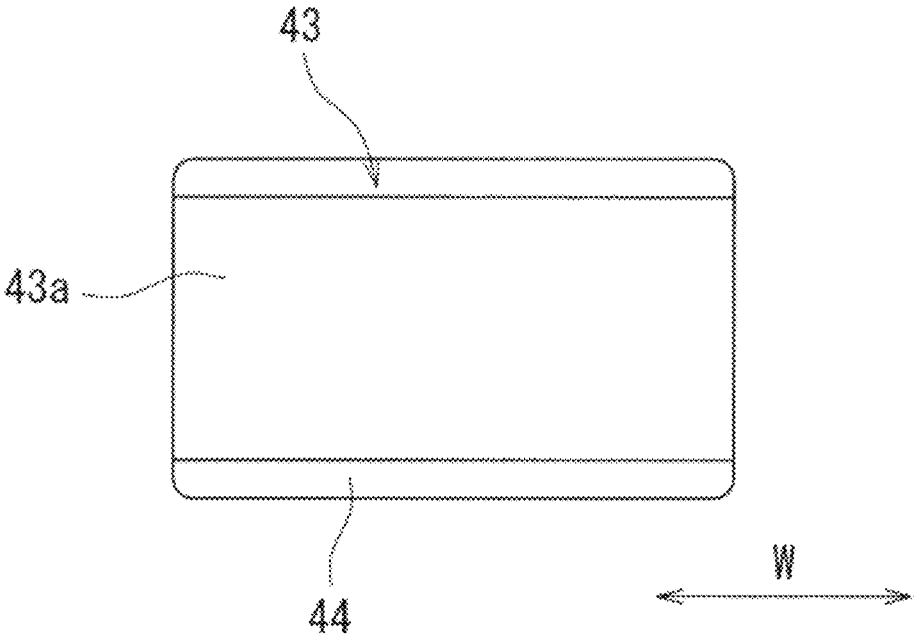
FIG. 6 is a plan view of heating elements as seen from a heating surface side.

FIG. 5 is a cross-sectional view of the heater attached to the fixing pad, and FIG. 6 is a plan view of the heating elements as seen from a heating surface side. In FIG. 5, hatching is omitted for the sake of the readability of the drawing.

The heater 40 (in particular, the heating elements 43) has a heating surface 43*a* that generates heat, and the heating surface faces toward the nip N (in FIG. 5, downward). The heating elements 43 and the substrate 41 are bonded together using an adhesive layer 45. As illustrated in FIG. 6, element electrodes 44 are provided at opposite ends of the heating surface 43*a* in the conveyance direction S of the paper P, overlapping with the power supply electrodes 42*a*. It should be noted that the element electrodes 44 can conduct electricity to the heating elements 43 as long as there is some degree of overlap with the power supply electrodes 42*a*. The configuration in which the heating surface 43*a* faces toward the fixing belt 31 allows for efficient heat transfer to the fixing belt 31.

As described above, the power supply electrodes 42*a* that supply electric power to the heater 40 are provided on the heating surface 43*a* side of the substrate 41. As a result of providing the power supply electrodes 42*a* on the substrate 41, which serves as an insulating layer, it is possible to supply electric power to the heater 40 with a simple configuration.

The heater 40 has a sliding layer 46 on the surface thereof in contact with the inner surface of the fixing belt 31. The sliding layer 46 can be formed from any material as long as the material reduces friction with the fixing belt 31. In the present embodiment, the sliding layer 46 is formed from glass. Providing the sliding layer 46, and thus ensuring the low friction leads to a reduction in torque and an improvement in durability.

Furthermore, the heater 40 is longer than the nip N in the conveyance direction S of the paper P. Thus, the heater 40 heats an area wider than the nip N, so that the toner image can be reliably transferred to the paper P.

The heater 40 may be fixed to the fixing pad 34 in portions of the substrate 41 where no heating element 43 is attached, or a back surface 43*b* of the heating elements 43 may be bonded to the fixing pad with an adhesive or the like.

Figure 7:
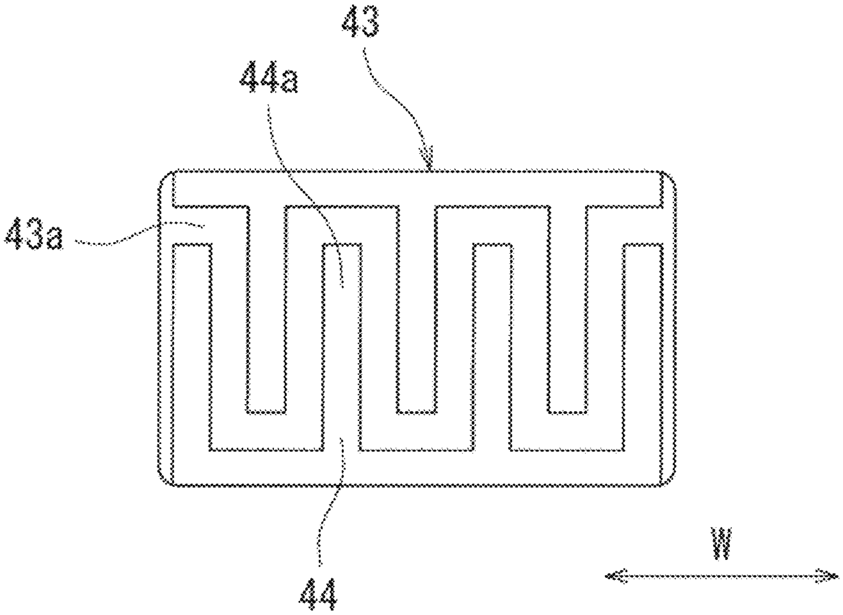
FIG. 7 is a plan view of heating elements according to a modification example as seen from a heating surface side.

FIG. 6 shows the configuration in which the element electrodes 44 are provided only at the opposite ends of the heating elements 43. However, the present embodiment is not limited as such, and may have a configuration in which the element electrodes 44 extend to the center of the heating elements 43. Referring to FIG. 7, the following describes a modification example in which the element electrodes 44 have an altered shape.

FIG. 7 is a plan view of heating elements according to the modification example as seen from the heating surface side.

FIG. 7 shows the heating surface 43*a* of the heating elements 43 according to the modification example. In the modification example, the element electrodes 44 are provided along the opposite ends of the heating surface 43*a*, and the element electrodes 44 have extending portions 44*a* extending from the opposite ends toward the center. The extending portions 44*a* that extend from one end and the extending portions 44*a* that extend from the other end are staggered. Consequently, an exposed portion of the heating surface 43*a* has a meandering shape. As a result of providing the extending portions 44*a* as described above, it is possible to prevent the heating surface 43*a* from having a portion distant from the element electrodes 44, so that electric power can be supplied to the entire heating surface 43*a* in a stable manner.

The shape according to the present modification example may be applied to the element electrodes 44 as appropriate depending on the size of the heating elements 43. Preferably, the shape including the extending portions 44*a* is applied to heating elements 43 that are large in size.

Second Embodiment

The following describes an image forming apparatus according to a second embodiment of the present disclosure with reference to the accompanying drawings.

The second embodiment differs from the first embodiment in the configuration of the heater 40. It should be noted that the second embodiment has substantially the same configuration as the first embodiment illustrated in FIGS. 1 to 7, and therefore only differences therebetween will be described and other details will be omitted.

Figure 8:
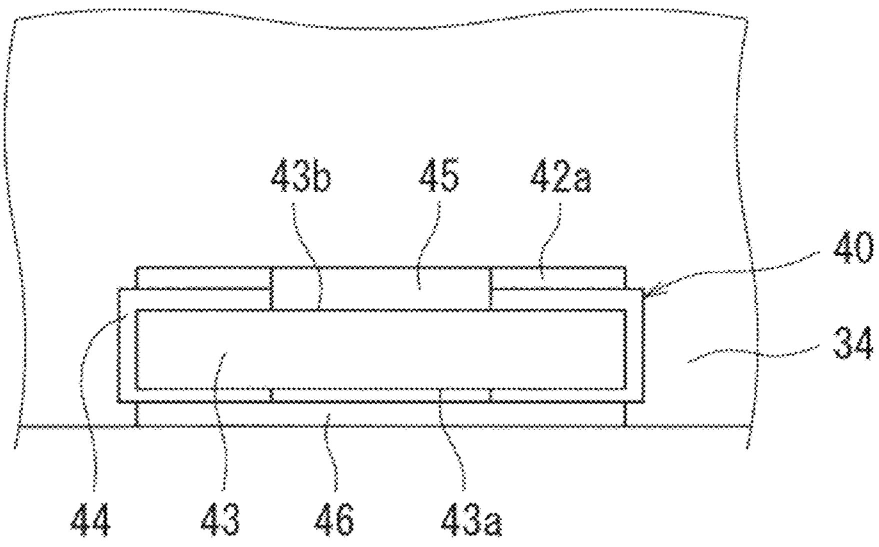
FIG. 8 is a cross-sectional view of a heater attached to a fixing pad in a second embodiment of the present disclosure.

FIG. 8 is a cross-sectional view of a heater attached to a fixing pad in the second embodiment of the present disclosure.

The second embodiment differs from the first embodiment in that the heater does not have a substrate 41. In the case of the heater 40 in the present embodiment, a back surface 43*b* thereof is attached to a fixing pad 34 using an adhesive layer 45. Furthermore, element electrodes 44 are provided on the back surface of the heater 40, and power supply electrodes 42*a* are overlaid on the element electrodes 44. The power supply electrodes 42*a* include electric wires 42 connected to, for example, end portions thereof that are not opposed to the heating elements 43. Furthermore, the heating elements 43 have conduction paths formed over side surfaces thereof for conducting electric power from the back surface 43*b* to the heating surface 43*a*. On the side surfaces, the conduction paths are insulated from the heating elements 43, and thus are configured to restrict heat generation between the conductive paths. By contrast, on the heating surface 43*a*, the conduction paths are configured to conduct electricity to the heating elements 43, so that the heating surface 43*a* generates heat. The above-described configuration, in which the electrodes are provided on the back surface 43*b*, allows a larger area of the heating surface 43*a* to be utilized, achieving efficient heating. In the present embodiment, a sliding layer 46 is attached to the heating surface 43*a* without the substrate 41 therebetween.

It should be noted that the embodiments disclosed herein are exemplary in all aspects, and are not intended to be construed as a basis of limiting interpretation. The technical scope of the present disclosure is not intended to be interpreted based only on the embodiments described above, and is intended to be defined based on the following claims. The technical scope of the present disclosure includes all variations that are equivalent in meaning and scope to the claims.

What is claimed is:

1. A fixing device for applying heat and pressure to a paper nipped between a cylindrical fixing belt and a pressure applicator to fix an image to the paper, the fixing device comprising:

a fixture that is in contact with an inner surface of the cylindrical fixing belt and that is located opposite the pressure applicator to form a nip between the fixture and the pressure applicator where the pressure is applied to the paper; and a heater attached to the fixture and having a positive temperature coefficient, wherein:

the heater has a heating surface that faces toward the nip and generates heat, the heating surface and the inner surface of the cylindrical fixing belt have an insulating layer therebetween, the insulating layer has, on a side thereof facing toward the heating surface, power supply electrodes that supply electric power to the heater, and the insulating layer is bonded to the heater in such a manner that element electrodes provided in the heater overlap with the power supply electrodes.

2. The fixing device according to claim 1, wherein the heater has a plurality of heating elements arranged in an axial direction of the pressure applicator.

3. The fixing device according to claim 1, wherein the heater further has, on a back surface thereof, electrodes opposite the heating surface, and has, over a side surface thereof, a conduction path that conducts the electric power from the back surface to the heating surface.

4. The fixing device according to claim 1, wherein the heater further has, on a surface thereof, a sliding layer in contact with the inner surface of the cylindrical fixing belt.

5. An image forming apparatus comprising the fixing device according to claim 1.

* * * * *